Figures 1, 2, 3:
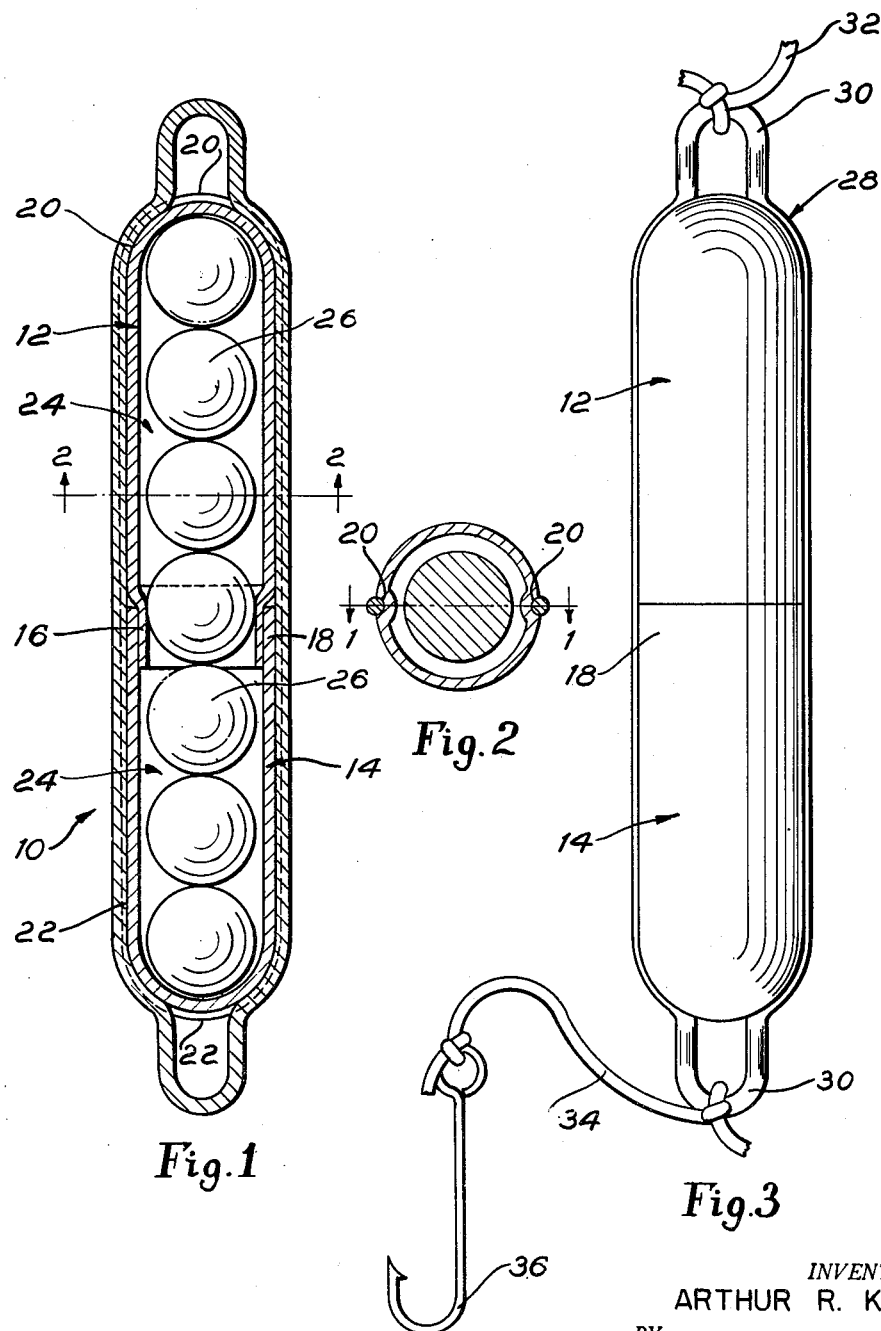

INVENTOR.
ARTHUR R. KLEIN
BY
*Joseph R. Tragno*
ATTORNEY

Patented June 10, 1952

2,600,002

UNITED STATES PATENT OFFICE 2,600,002

FISHING EQUIPMENT

Arthur R. Klein, Erieside, Ohio

Application June 23, 1949, Serial No. 100,817

1 Claim. (Cl. 43—43.14)

This invention relates to fishing equipment and more particularly to a fishing line sinker.

Broadly the invention comprehends the provision of a variable weight adjustable fishing line sinker comprising a tubular container adapted to hold and retain a plurality of weight elements therein.

An object of the invention is the provision of a fishing line sinker of simple, economical to manufacture, construction which is adjustable to a wide range of weight.

Another object of the invention is the provision of a variable weight fishing line sinker that can be readily and easily changed in weight during the course of fishing.

Another object of the invention is the provision of a fishing line sinker of cylindrical container construction adapted to hold a plurality of weight elements which can be easily added or removed from the container and a wire clip assembled on the container for securely maintaining the container closed and for connection to the fishing line with which it is to be associated.

A further object of the invention is the provision of a variable weight fishing line sinker comprising a pair of tubes fitted together in capsule form adapted to carry a varied number of weight elements and a clip member for holding the tubes in fitted assembly with one or more weights therein as requirements might necessitate.

A yet further object of the invention is the provision of a fishing line sinker of capsule construction having an endless wire clip member extending axially exteriorly of the capsule in embracing relation thereto for firmly holding the capsule in assembly, said clip being provided with ears oppositely disposed at the end extremities of the capsule for receipt of a fishing line to be secured thereto and said capsule being adapted to carry a plurality of weight elements.

Further objects and advantages of the invention will appear from the following description taken in connection with the drawings forming a part of the specification, and in which, Fig. 1 is a vertical cross-sectional view of a fishing line sinker taken along substantially line 1—1, Fig. 2, Fig. 2 is a horizontal cross-sectional view of the sinker taken along substantially line 2—2, Fig. 1, and Fig. 3 is a vertical front plan view of the sinker in assembly with a fishing line and hook.

The present fishing line sinker was devised for the purpose of providing a sinker of adjustable variable weight and simple construction permitting of the easy weight changing of the sinker during the course of fishing so that if and when conditions of weather, water current flow, etc. might necessitate the changing of the weight of the sinker so as to obtain the proper tautness of the fishing line desired by the fisherman manipulating the line.

The sinker for purposes of simplicity and economy of construction is made in the form of a capsule comprising a pair of tubular members closed at one end and open at the other end; said members being fitted in telescoping relation at their open ends adapted to hold and retain weighted elements therein, the number depending upon the weight of the sinker per se desired. The members when in assembled telescoping relation with the weights therein are secured in assembly by an endless wire clip extending in embracing relation axially of the length of the members, said clip having loop or ear ends at the opposite end extremities of the capsule per se for receipt of a fishing line to which the sinker is to be associated and attached.

Referring to the drawings for more specific details of the invention 10 represents generally a fishing line sinker comprising a pair of tubes 12 and 14, respectively, each having a closed end and an open end, the open end 16 of tube 12 being reduced in diameter over a short length thereof for receipt concentrically in the open end 18 of tube 14 with a slight press fit, the purpose of which will hereinafter appear. The tubes 12 and 14 in their telescoping assembly provide for a smooth aligned external surface therebetween and provide in conjunction with one another in mating relation along the axial length of the tubes and encircling their respective closed ends, grooves 20 and 22 incorporated respectively in tubes 12 and 14, said grooves being of predetermined width, the purpose of which will hereinafter appear.

The tubes in their assembled position are adapted to retain in the closed cavity 24 formed therebetween a plurality of spherical or like lead weights 26 for use in establishing a desirable weight for sinker 10 in the use thereof with appropriate fishing equipment.

With the tubes assembled having the grooves 16 and 18 in aligned mating relation a wire clip 28 of endless construction is received in the grooves 20 and 22 serving to maintain the tubes securely in assembly. The clip extends the full axial length of the tubes 12 and 14 and partially radially around the ends of the respective tubes 12 and 14 and terminates at the axial extremities of the assembled tubes in eyelets 30, one eyelet of which has tied or looped thereto one end of a fishing line 32 and the other eyelet has looped thereto one end of a short line 34 having a fish hook 36 tied to its other extremity disposed away from eyelet 30.

Fig. 1 illustrates the telescoping structure provided between the respective open ends 16 and 18 of the tubes 12 and 14 whereas Fig. 2 illustrates how the wire clip is received in fit relation in the groove 20 provided in tube 12, the same relation pertaining to the fit of clip 28 in the groove 22.

The clip 28 is preferably made of spring steel wire of a diameter correspondingly with the width of grooves 20 and 22 so as to facilitate the assembly of the clip upon the assembled tubes and the positive securing of the tubes together when the clip is so assembled thereon.

Fig. 1 illustrates a condition wherein the cavity 24 is completely filled with weights 26 thus establishing the maximum weight of the sinker for use but it is conceivable that the weight of the sinker can be readily changed merely by varying the number of weights carried in the cavity. The weight of the sinker can be varied at any time either prior to or during the course of use by merely springing the clip 28 from out of grooves 20 and 22 so as to permit the disassembly of the tubes and varying of the number of weights to be carried. The clip can be removed from tubes during use of the sinker without necessity of disrupting the fishing line and hook line normally attached to the clip in the eyelets 30 thereof.

The tubes 12 and 14 in their assembled relation forming a capsule unit resemble a conventional type of lead sinker but have the added advantage that the external surface of the capsule can be made of a metal either in metallic finish or color that might act as a lure to attract fish thereto when the fishing line and hook with sinker thereon are submerged in the water.

Although the drawings illustrate and the specification defines a specific form of sinker of variable weight adjustment, variations in structure thereto will readily occur to anyone versed in the art and accordingly the invention is to be limited only to the extent of the appended claim.

I claim:

A sinker comprising a pair of hollow cylindrical elements having semi-spherical ends, each having the same structural characteristics as the other except as to length and as to the adjacent ends thereof, one of said ends being received within the other so that the major portion of the outer surfaces of both elements are in alignment, said elements in such relation being adapted to retain therein one or more weight elements, each of said elements having on a portion of the outer surface thereof grooves, each groove extending substantially throughout the length of the element, one of said elements having its groove extending to a point slightly spaced from the open end of that element and a wire clip member having a diameter corresponding substantially to the diameter of the grooves and having a large central opening corresponding substantially to the length of the combined grooves of both elements when the elements are in an assembled relation, except at the semi-spherical ends thereof, said clip having smaller openings at the ends thereof providing spaces between the inner surfaces of the ends of the clip members and the outer surfaces of the ends of the elements to facilitate the attaching of fishing elements thereto.

ARTHUR R. KLEIN.

REFERENCES CITED

The following references are of record in the file of this patent:

UNITED STATES PATENTS

| Number | Name | Date |
| --- | --- | --- |
| 690,819 | Anderson | Jan. 7, 1902 |
| 765,482 | Hardy | July 19, 1904 |
| 1,776,090 | Shroyer | Sept. 16, 1930 |
| 1,858,550 | Kahle | May 17, 1932 |
| 1,878,015 | Steffensen | Sept. 20, 1932 |

FOREIGN PATENTS

| Number | Country | Date |
| --- | --- | --- |
| 280,288 | Great Britain | Nov. 14, 1927 |